(12) United States Patent
Cho et al.

(10) Patent No.: US 7,332,192 B2
(45) Date of Patent: Feb. 19, 2008

(54) SOY PROTEIN ISOLATE

(75) Inventors: Myong J. Cho, Chesterfield, MO (US); Richard Shen, Kirkwood, MO (US); Robert Mooshegian, Columbia, IL (US)

(73) Assignee: Solae, LLC, St. Louis, MO (US)

( * ) Notice: Subject to any disclaimer, the term of this patent is extended or adjusted under 35 U.S.C. 154(b) by 222 days.

(21) Appl. No.: 11/016,048

(22) Filed: Dec. 17, 2004

(65) Prior Publication Data
US 2006/0134310 A1  Jun. 22, 2006

(51) Int. Cl.
*A23L 1/20* (2006.01)

(52) U.S. Cl. .............. 426/656; 426/598; 426/599; 426/634; 530/343

(58) Field of Classification Search ........ 426/656, 426/598, 599, 634; 530/343
See application file for complete search history.

(56) References Cited

U.S. PATENT DOCUMENTS

| | | | |
|---|---|---|---|
| 3,830,942 A | 8/1974 | Hawley | |
| 3,846,560 A | 11/1974 | Hempenius et al. | |
| 3,876,806 A | 4/1975 | Hempenius et al. | |
| 3,897,570 A | 7/1975 | Yokotsuka et al. | |
| 4,100,024 A | 7/1978 | Adler-Nissen | |
| 4,107,334 A | 8/1978 | Jolly | |
| 4,443,540 A * | 4/1984 | Chervan et al. | 435/68.1 |
| 4,687,739 A | 8/1987 | Sugisawa et al. | |
| 5,097,017 A | 3/1992 | Konwinski | |
| 6,221,423 B1 * | 4/2001 | Cho et al. | 426/656 |
| 6,811,804 B2 * | 11/2004 | Patel et al. | 426/598 |
| 6,887,508 B2 * | 5/2005 | Huang | 426/573 |
| 2005/0053705 A1 * | 3/2005 | Gao et al. | 426/422 |

FOREIGN PATENT DOCUMENTS

| | | |
|---|---|---|
| EP | 1338210 A1 | 8/2003 |
| JP | 57016674 | 1/1982 |

* cited by examiner

*Primary Examiner*—Anthony Weier
(74) *Attorney, Agent, or Firm*—James L. Cordek; Holly M. Amjad

(57) ABSTRACT

A soy protein isolate and method for preparing the same are shown. The novel soy protein isolate possesses excellent suspension stability and flavor. The process used to produce the soy protein isolate includes an enzyme hydrolysis process, and the resulting soy protein isolate can be used in acidic beverage formulations.

10 Claims, No Drawings

SOY PROTEIN ISOLATE

FIELD OF THE INVENTION

The present invention generally relates to a soy protein isolate and process for producing the same. More particularly, the present invention relates to an enzymatically modified soy protein isolate that exhibits superior suspension stability and flavor when incorporated into products such as acidic beverages.

BACKGROUND OF THE INVENTION

The benefits of soy protein are well documented. According to nutritional studies, a diet rich in soy proteins can reduce serum cholesterol levels in humans. It has also been suggested that soy protein consumption leads to a reduced risk of illness and disorders such as osteoporosis, colon cancer, and prostate cancer. Thus, soy proteins and products including soy proteins provide significant health benefits.

Many foods and beverages are fortified with supplemental protein derived from soybeans. Native protein materials derived from soybeans, however, cannot be used effectively as a supplement in certain beverages and food compositions in which nutritional fortification is desirable, such as acidic beverages. Exemplary acidic beverages include carbonated and non-carbonated soft drinks, juices, and sports drinks. These acidic beverages generally have pH levels at which unmodified soy protein materials are substantially insoluble.

Adding unmodified soy protein materials to acidic beverages typically results in cloudiness and sedimentation. The result is a consumer product that has an undesirable appearance after being stationary for a period of time, such as on the grocery store shelf or in a consumer's refrigerator or pantry. Additionally, the consumer is required to shake or otherwise agitate the product prior to consumption in order to resuspend or redissolve the soy protein material contained therein. Even with significant agitation, not all of the soy protein material in the beverage may be resuspended or redissolved in the product. Thus, the consumer may not feel that they are receiving the full benefits of the soy protein present in the beverage, because they are not able to drink the sediment stuck to the bottom and sides of the container.

It is generally known in the art to modify soy protein materials by hydrolyzing the soy protein. Soy protein hydrolysates are commonly used to form nutritional acidic beverages, since soy protein hydrolysates are relatively more soluble in acidic aqueous solutions than unmodified soy protein. Soy protein materials are often hydrolyzed by treatment with proteolytic enzymes under conditions at which the enzyme hydrolyzes the soy protein into intermediate-length peptides. These intermediate-length peptides are relatively more soluble in acidic solutions than unmodified soy protein materials are, and have been frequently used as supplements in consumer applications such as acidic beverages. For example, in U.S. Pat. No. 3,897,570, Yokotsuka et al. describe a process for providing an acidic beverage containing soy protein wherein a slurry is formed of soy protein material, the slurry is heated by steam under pressure to denature the soy protein in the slurry, and the soy protein is hydrolyzed with an acid protease at a pH of 2.5 to 6.0 so the ratio of formol state nitrogen to total nitrogen in the slurry filtrate is less than 20%, thus preventing over-decomposition of the soy protein material. Yokotsuka et al. then filter a clear portion of the slurry and add it to an acidic beverage.

In addition to possessing good suspension stability, the food or beverage application containing soy protein must have good flavor. Generally, the hydrolysis of soy protein into intermediate-length peptides is preferred. This is due to the fact that soy protein is typically more soluble in acidic solutions, and also because the presence of short chain peptides often results in a soy protein product with a bitter, undesirable flavor. For example, in U.S. Pat. No. 3,846,560, Hempenius et al. describe a process wherein a slurry of soy protein material is hydrolyzed with a proteolytic enzyme, preferably at a neutral pH, whereby the process is terminated before it reaches the point of producing a significant amount of products with a bitter taste. Hempenius et al. then remove the precipitated material from the hydrolyzed soy protein slurry to obtain a clear soy protein solution for use in preparing an acidic beverage.

As can be seen from the foregoing, there is a need for a soy protein isolate having good suspension stability and flavor suitable for use in food and beverage applications, and specifically in acidic beverages.

SUMMARY OF THE INVENTION

Among the various aspects of the present invention is a process for producing a soy protein isolate having desirable properties such as excellent flavor and suspension stability and homogeneity over a period of time in acidic media. The process uses an enzyme hydrolysis treatment step to hydrolyze the soy protein to create the soy protein isolate.

Briefly, therefore, the present invention is directed to a soy protein isolate. The soy protein isolate comprises soy protein material having an average molecular weight of from about 12,000 Daltons to about 18,000 Daltons and a degree of hydrolysis of from about 50 STNBS to about 70 STNBS. The soy protein isolate has a soluble solids index of from about 80% to about 100% at a pH of from about 7.0 to about 7.8, an average particle size of from about 15 µM to about 60 µM, greater than 99% homogeneity in water at a pH of from about 7.0 to about 7.8 after 30 minutes, and greater than 90% homogeneity in water at a pH of from about 7.0 to about 7.8 after 2 hours.

The present invention is further directed to a ready-to-drink acidic beverage comprising a soy protein isolate. The soy protein isolate comprises a soy protein material having an average molecular weight of from about 12,000 Daltons to about 18,000 Daltons and a degree of hydrolysis of from about 50 STNBS to about 70 STNBS. The soy protein isolate has an average particle size of from about 15 µM to about 60 µM.

The present invention is also directed to a process for producing a soy protein isolate. This process comprises dispersing white flakes produced from soybeans in a liquid to produce a soy protein extract and separating the insoluble material from the soy protein extract to produce a soluble soy protein extract. The pH of the soluble soy protein extract is then adjusted to about the isoelectric point of soy protein with an acid to form a precipitated soy protein mixture. The precipitated soy protein mixture is then centrifuged and the supernatant is decanted from the resulting soy protein curd. Once the soy protein curd is formed, the process of the present invention further comprises diluting the soy protein curd with water to form a soy protein slurry, adjusting the pH of the soy protein slurry with a suitable base, heating, and reacting the soy protein slurry with an enzyme without maintaining the pH level to form an enzyme hydrolyzed soy protein mixture, wherein the enzyme hydrolyzed soy protein mixture is the soy protein isolate.

Other objects and features will be in part apparent and in part pointed out hereinafter.

DETAILED DESCRIPTION OF THE INVENTION

In accordance with the present invention, a soy protein isolate and a process for producing a soy protein isolate are disclosed. Soy protein isolates produced by the novel process described herein have excellent solubility, suspension stability and homogeneity over long periods of time in acidic beverages. Additionally and surprisingly, it has been found that these soy protein isolates also have excellent flavor properties when utilized in consumer products, such as acidic beverages.

The process for producing the soy protein isolate of the present invention generally comprises forming a precipitated soy protein curd and hydrolyzing the precipitated soy protein curd with an enzyme. More specifically, the process for producing the soy protein isolate of the present invention first comprises dispersing white flakes produced from soybeans in a liquid to produce a soy protein extract. The insoluble material is then separated from the soy protein extract to form a soluble soy protein extract. The pH of the soluble soy protein extract is then adjusted to about the isoelectric point of soy protein (~pH 4.5) with a suitable acid to form a precipitated soy protein curd mixture. The precipitated soy protein curd mixture is centrifuged and the supernatant is decanted from the resulting soy protein curd. Once the soy protein curd is formed, the process of the present invention further comprises diluting the soy protein curd with water to form a soy protein slurry. The pH of the soy protein slurry is then adjusted to an alkaline pH with a suitable base, and the pH-adjusted soy protein slurry is heated. The heated pH-adjusted soy protein slurry is then reacted with an enzyme to form an enzyme hydrolyzed soy protein mixture. The pH of the resulting enzyme hydrolyzed soy protein mixture is adjusted to a pH of from about 7.0 to about 7.6 with a suitable acid, wherein the resulting pH-adjusted enzyme hydrolyzed soy protein mixture is the soy protein isolate.

Further optional steps include heating the pH-adjusted enzyme hydrolyzed soy protein mixture, cooling the pH-adjusted enzyme hydrolyzed soy protein mixture, and spray drying the pH-adjusted enzyme hydrolyzed soy protein mixture to form a dried soy protein isolate.

Formation of the Precipitated Soy Protein Curd

Specifically, the process for the formation of the precipitated soy protein curd begins by producing white flakes from whole soybeans. Generally, the conventional process for producing white flakes from whole soybeans comprises: 1) dehulling whole soybeans; 2) flaking the dehulled soybeans; 3) extracting soybean oil from the flaked soybeans with a solvent such as hexane; and 4) desolventizing the defatted soybeans without high heating or toasting to produce white flakes. The white flakes can also optionally be ground to produce soy flour. For purposes of the present invention, it is contemplated that the term "white flakes" includes soy flour, since soy flour is merely ground white flakes. It is further contemplated that the whole soybeans used in the process of the present invention may be standard, commoditized soybeans, soybeans that have been genetically modified (GM) in some manner, or non-GM identity preserved soybeans.

The general procedure for the above-described steps 1 through 4 is well understood. See U.S. Pat. No. 5,097,017 to Konwinski and U.S. Pat. No. 3,897,574 to Pass, each assigned to the assignee of the present invention, the disclosures of which are hereby incorporated by reference. See also "Extraction of Oil from Soybeans," J. Am. Oil Chem. Soc., 58, 157 (1981) and "Solvent Extraction of Soybeans," J. Am. Oil Chem. Soc., 55, 754 (1978).

White flakes produced from soybeans by the above-described steps are utilized as the starting material in the precipitated soy protein curd formation process. Soy protein is extracted from the white flakes by dispersing them in a liquid. In one embodiment of the present invention, the soy protein is extracted from the white flakes by dispersing them in water at a pH of from about 6.4 to about 7.5. Preferably, the soy protein is extracted from the white flakes by dispersing them in water at a pH of from about 6.4 to about 6.8; more preferably, the water is at a pH of about 6.7. In an alternative embodiment of the present invention, the soy protein is extracted from the white flakes by dispersing them in an alkaline solution at a pH of from about 9.5 to about 10.0. Preferably, the soy protein is extracted from the white flakes by dispersing them in an alkaline solution at a pH of from about 9.6 to about 9.8; more preferably, the alkaline solution is at a pH of about 9.7. Preferably, the alkaline solution comprises an alkaline material selected from the group consisting of sodium hydroxide, calcium hydroxide, and mixtures thereof. The soluble soy protein extract found in the liquid is preferably separated from the insoluble material, such as soy fiber and cellulose, by filtration and/or by centrifuging the soy protein extract and decanting the soluble soy protein extract from the undesirable insoluble material.

A suitable acid is then added to the soluble soy protein extract to adjust the pH to about the isoelectric point of soy protein to precipitate the soy protein, forming a precipitated soy protein curd mixture. Preferably, the pH of the soluble soy protein extract is adjusted to a pH of from about 4.0 to about 5.0; more preferably to a pH of from about 4.4 to about 4.6. Preferably, the pH is adjusted with hydrochloric acid, phosphoric acid, or mixtures thereof. The precipitated soy protein curd mixture is then centrifuged, and the supernatant is decanted and discarded. The remaining material is the precipitated soy protein curd.

Preferably, the precipitated soy protein curd produced by the above-described process is comprised of from about 7.5% soy protein (by weight dry matter) to about 16.9% soy protein (by weight dry matter). Still more preferably, the precipitated soy protein curd is comprised of from about 9.5% soy protein (by weight dry matter) to about 15.0% soy protein (by weight dry matter). Most preferably, the precipitated soy protein curd is comprised of from about 11.3% soy protein (by weight dry matter) to about 13.2% soy protein (by weight dry matter).

The precipitated soy protein curd is also preferably comprised of from about 82% to about 92% moisture. Still more preferably, the precipitated soy protein curd is comprised of from about 84% to about 90% moisture. Most preferably, the precipitated soy protein curd is comprised of from about 86% to about 88% moisture.

Additionally, the precipitated soy protein curd is preferably comprised of from about 0.36% to about 0.8% ash (by weight dry matter). Still more preferably, the precipitated soy protein curd is comprised of from about 0.45% to about 0.75% ash (by weight dry matter). Most preferably, the precipitated soy protein curd is comprised of from about 0.55% to about 0.65% ash (by weight dry matter).

Enzyme Hydrolysis of the Precipitated Soy Protein Curd

Generally, the process for the enzyme hydrolysis of the precipitated soy protein curd comprises diluting the precipitated soy protein curd with water to form a soy protein slurry and adjusting the pH of the soy protein slurry to an alkaline pH with a suitable base. This is followed by heating the pH-adjusted soy protein slurry and reacting the pH-adjusted soy protein slurry with an enzyme without maintaining the pH level to form an enzyme hydrolyzed soy protein mixture. The resulting enzyme hydrolyzed soy protein mixture is the soy protein isolate. Additional optional steps are described in more detail below.

In the first step described above, the soy protein curd is diluted with water to form a soy protein slurry. Preferably, the soy protein curd is diluted with water to produce a soy protein slurry that is about 8% to about 18% solids, by weight. Still more preferably, the soy protein slurry is about 10% to about 16% solids, by weight. Most preferably, the soy protein slurry is about 12% to about 14% solids, by weight.

The pH of the soy protein slurry is then adjusted to a pH of from about 9.5 to about 10.5 with a suitable base. More preferably, the pH of the soy protein slurry is adjusted to about 9.8 to about 10.2; most preferably to about 10.0. Suitable bases include sodium hydroxide, potassium hydroxide, and mixtures thereof. Preferably, the pH of the soy protein slurry is adjusted with sodium hydroxide.

The pH-adjusted soy protein slurry is then heated and the temperature is held during the addition and reaction of the enzyme. This heating step provides for a more effective and complete enzyme hydrolysis process. Preferably, the pH-adjusted soy protein slurry is heated to a temperature of from about 48° C. to about 58° C. Still more preferably, the pH-adjusted soy protein slurry is heated to a temperature of from about 48° C. to about 55° C.; most preferably, the pH-adjusted soy protein slurry is heated to a temperature of from about 51° C. to about 53° C. Preferred heating methods include direct or indirect heating with steam.

After the soy protein material contained in the pH-adjusted soy protein slurry is heated, an enzyme is added to the pH-adjusted soy protein slurry. The preferred enzyme is an alkaline protease. The amount of alkaline protease added to the pH-adjusted soy protein slurry corresponds to the weight of the soy protein curd prior to pH adjustment. Preferably, the weight of the alkaline protease added to the pH-adjusted soy protein slurry is from about 0.3% to about 0.5% of the weight of the soy protein curd prior to pH adjustment. The enzyme hydrolysis of the soy protein material at an alkaline pH facilitates two reactions in the pH-adjusted soy protein slurry. In one reaction, the long chain peptides of the intact soy protein material are broken down by peptide hydrolysis. The other reaction is a deamidate reaction between amide groups (—$NH_3$) of glutamines and hydroxide groups in the alkaline solution. The degree of enzyme hydrolysis is determined by the STNBS method and average molecular weight distribution, described in further detail below.

Representative alkaline proteases suitable for use in the processes of the present invention include Alcalase® (Novo Nordisk A/S, Denmark); Alkaline Protease Concentrate (Valley Research, South Bend, Indiana); and Protex™ 6 L (Genencor, Palo Alto, Calif.). Preferably, the enzyme is Alcalase®.

The time period required for effective enzyme hydrolysis of the soy protein material is typically from about 30 minutes to about 60 minutes. Still more preferably, enzyme hydrolysis is allowed to occur for about 30 minutes to about 50 minutes; most preferably, enzyme hydrolysis is allowed to occur for about 35 to about 45 minutes.

During the reaction of the alkaline protease enzyme with the soy protein slurry, the pH is not maintained at a particular level. Rather, it is allowed to fluctuate according to the pH of the alkaline protease enzyme and the chemical processes that occur during the hydrolysis of the soy protein material contained in the pH-adjusted soy protein slurry. Typically, the pH of the resulting enzyme hydrolyzed soy protein mixture will have moved from about 9.5-10.5 to about 8.0-9.0. After the time period necessary for enzyme hydrolysis is complete, however, the pH of the enzyme hydrolyzed soy protein mixture is adjusted to a pH of from about 7.0 to about 7.6 with a suitable acid. More preferably, the pH of the enzyme hydrolyzed soy protein mixture is adjusted to about 7.2 with a suitable acid. Suitable acids include hydrochloric acid, phosphoric acid, citric acid, and mixtures thereof. The pH of the enzyme hydrolyzed soy protein mixture is adjusted in order to facilitate the use of the soy protein isolate of the present invention in consumer products such as acidic beverage formulations.

In one embodiment of the present invention, the pH-adjusted enzyme hydrolyzed soy protein mixture is the soy protein isolate. In an alternative embodiment of the present invention, the pH-adjusted enzyme hydrolyzed soy protein mixture is optionally heated, cooled, and spray dried to form a dry product. Preferably, the pH-adjusted enzyme hydrolyzed soy protein mixture is heated to a temperature of from about 146° C. to about 157° C. for about 5 seconds to about 15 seconds, more preferably, to a temperature of from about 149° C. to about 154° C. for about 7 seconds to about 12 seconds, and most preferably, from about 150° C. to about 153° C. for about 8 to about 10 seconds. This optional heat-treatment acts to sterilize or pasteurize the product to reduce bacterial growth.

Following this heating step, the pH-adjusted enzyme hydrolyzed soy protein mixture is cooled by a suitable method, such as vacuum flushing, to a temperature of from about 48° C. to about 58° C.; more preferably to a temperature of from about 49° C. to about 55° C. Most preferably, the pH-adjusted enzyme hydrolyzed soy protein mixture is cooled to a temperature of from about 51° C. to about 53° C. The length of cooling is preferably from about 10 minutes to about 20 minutes. Still more preferably, the length of cooling is from about 12 minutes to about 18 minutes. Most preferably, the length of cooling is from about 14 minutes to about 16 minutes. Following this cooling step, the pH-adjusted enzyme hydrolyzed soy protein mixture, which is the soy protein isolate, may then optionally be spray dried by any conventionally acceptable means.

Soy Protein Isolate Characteristics

The present invention is also directed to the soy protein isolate formed by the process as described above. The soy protein isolate is comprised of soy protein material having an average molecular weight of from about 12,000 Daltons to about 18,000 Daltons and a degree of hydrolysis of from about 50 STNBS to about 70 STNBS. The soy protein isolate has a soluble solids index of from about 80% to about 100% at a pH of from about 7.0 to about 7.8, an average particle size of from about 15 μM to about 60 μM, greater than 99% homogeneity in water at a pH of from about 7.0 to about 7.8 after 30 minutes, and greater than 90% homogeneity in water at a pH of from about 7.0 to about 7.8 after 2 hours. Descriptions, methods of measuring the above parameters, and examples thereof are described in further detail below.

Measurement of the Average Molecular Weight of the Soy Protein Material

The solubility of a soy protein isolate in consumer applications such as ready-to-drink acidic beverages increases as the average molecular weight of the soy protein material decreases. Therefore, when the average molecular weight of the soy protein material is lower, there is less sediment in the acidic beverage. However, as the average molecular weight decreases, the flavor of the soy protein isolate also deteriorates. Ideally, the soy protein isolate possesses both high solubility and good flavor.

One method for determining the average molecular weight profile of soy protein material in a soy protein isolate is by size exclusion chromatography ("SEC") on a high performance liquid chromatography system. SEC is typically used for the separation of large compounds with molecular weights greater than 1,000 Daltons. The SEC method separates these large solute particles by their actual size.

The stationary phase particles located in the columns used have a network of uniform pores into which some solute particles can diffuse. Molecules that are larger than the pores are excluded, i.e., unretained, whereas molecules that are smaller than the pores are retained in the stationary phase. Residence times in the pores depend on the size of the solute; larger molecules spend a relatively short amount of time in the pores, and therefore are the least retained. Smaller molecules are retained for a relatively longer period of time. Because retention is based solely on this physical impedance, as opposed to chemical interaction, the mobile phase does not play a critical role in SEC.

The average molecular weight profile of a soy protein material comprising the soy protein isolate of the present invention can be determined, for example, using a ZORBAX-GF-250 (9.4×250 mm) size exclusion column (Agilent Technologies, Palo Alto, Calif., Catalog number 884973-901) on a high performance liquid chromatography system. The mobile phase is prepared by first dissolving 56.6 g of dipotassium hydrogen phosphate and 3.5 g monopotassium dihydrogen phosphate in 1 L of water, followed by the addition of 573.18 g of guanidine HCl. The mobile phase is then adjusted to pH 7.6-7.8 with 10N potassium hydroxide. The column is calibrated and standard curves are constructed for each run using proteins of known molecular weight, thereby allowing the average molecular weight of the soy protein material in the soy protein isolate samples to be evaluated. Table 1 contains a list of the standard proteins, suitable amounts to be used, and their molecular weights.

TABLE 1

Standard Proteins, Amounts, and Molecular Weight for Standard Curve Calculation

| Standard vial | Contents | Amount | Molecular Weight (Daltons) |
|---|---|---|---|
| 1 | Hex (ARG-GLY-PRO-PHE-ILE) (Sigma A-2152) | 0.00050 g | 685 |
| 2 | DNA (Sigma D-1501) | 0.00160 g | 94,550 |
|   | AlphaChymo (Sigma C-4879) | 0.0020 g | 25,700 |
| 3 | BSA (Sigma A-8531) | 0.00500 g | 66,000 |
|   | Myoglobin (Sigma M-1882) | 0.00500 g | 17,000 |
|   | Aprotin (Sigma A-3886) | 0.00300 g | 6,500 |
| 4 | Ovalbumin (Sigma A-2512) | 0.00500 g | 44,000 |
|   | Cytochrome C (Sigma C-7150) | 0.00500 g | 12,400 |

The standards and soy protein isolate samples are prepared for injection onto the size exclusion column by mixing 0.3 g DL-Dithiothreitol (DTT) (Sigma D-0632) per 100 ml of the mobile phase solution. The mobile phase/DTT mixture is added to Standard vials 2-4 (5 ml), and to the soy protein isolate samples (10 ml). All Standard vials and soy protein isolate samples are heated, except Standard vial 1, in a 65° C. shaker (100 shakes/min) water bath for 3 hours. The Standard vials and soy protein isolate samples are filtered through syringes and injected onto the size exclusion column for analysis.

Preferably, the soy protein isolate of the present invention is comprised of soy protein material having an average molecular weight of about 12,000 Daltons to about 18,000 Daltons. More preferably, the average molecular weight of the soy protein material is about 13,000 Daltons to about 17,000 Daltons. Still more preferably, the average molecular weight of the soy protein material is about 14,500 Daltons to about 15,500 Daltons. Most preferably, the average molecular weight of the soy protein material is about 14,000 Daltons to about 15,000 Daltons Measurement of the Degree of Hydrolysis of the Soy Protein Material Soy protein material that has a high degree of hydrolysis typically also has a lower average molecular weight. Therefore, a soy protein isolate comprised of soy protein material possessing a high degree of hydrolysis has better suspension characteristics in consumer applications, such as ready-to-drink acidic beverages, but has a less desirable flavor. One method for determining the degree of hydrolysis for highly hydrolyzed soy protein material is by using the Simplified Trinitrobenzene Sulfonic acid (STNBS) method.

Primary amines exist in soy protein material as amino terminal groups and as the amino group of lysyl residues. The process of enzymatic hydrolysis cleaves the peptide chain structure of soy protein material, creating one new amino terminal group with each new break in the chain. Trinitrobenzene sulfonic acid (TNBS) reacts with these primary amines to produce a chromophore which absorbs light at 420 nm. The intensity of color developed from the TNBS-amine reaction is proportional to the total number of amino terminal groups and, therefore, is an indicator of the degree of hydrolysis of a soy protein sample.

To determine the degree of hydrolysis of a soy protein material comprising a soy protein isolate, 0.1 g of the soy protein isolate sample is added to 100 ml 0.025N NaOH. The sample mixture is stirred for 10 minutes and is filtered through Whatman No. 4 filter paper. A 2 ml portion of the sample mixture is then diluted to 10 ml with 0.05M sodium borate buffer (pH 9.5). A 2 ml blank of 0.025N NaOH is also diluted to 10 ml with 0.05M sodium borate buffer (pH 9.5). Aliquots (2 ml) of the sample mixture and the blank (2 ml) are then placed in separate test tubes. Duplicate 2 ml samples of glycine standard solution (0.005M) are also placed in separate test tubes. Then, 0.3M TNBS (0.1-0.2 ml) is added to each test tube and the tubes are vortexed for 5 seconds. The TNBS is allowed to react with each soy protein isolate sample, blank, and standard for 15 minutes. The reaction is terminated by adding 4 ml of phosphate-sulfite solution (1% 0.1M $Na_2SO_3$, 99% 0.1M $NaH_2PO_4 \cdot H_2O$) to each test tube with vortexing for 5 seconds. The absorbance of all soy protein isolate samples, blanks, and standards are recorded against deionized water within 20 minutes of the addition of the phosphate-sulfite solution.

The STNBS value, which is a measure of $NH_2$ moles/$10^5$ g protein, is then calculated using the following formula:

$$STNBS = (As_{420} - Ab_{420}) \times (8.073) \times (1/W) \times (F)(100/P)$$

wherein $As_{420}$ is the TNBS absorbance of the sample solution at 420 nm; $Ab_{420}$ is the TNBS absorbance of the blank at 420 nm; 8.073 is the extinction coefficient and dilution/unit conversion factor in the procedure; W is the weight of the soy protein isolate sample; F is a dilution factor; and P is the percent protein content of the sample, measured using the Kjeldahl, Kjel-Foss, or LECO combustion procedures.

Once the STNBS value is determined for the soy protein material in a given soy protein isolate sample, the percent degree of hydrolysis can be determined by the following formula, if so desired:

Degree of Hydrolysis(%)=((STNBS Value$_{Sample}$-24)/885)(100)

wherein 24 is the TNBS correction for lysyl amino group of non-hydrolyzed isolated soy protein and 885 is the theoretical total TNBS value for the complete isolated soy protein hydrolysate (derived from the total amino acid profile of isolated soy proteins).

Preferably, the soy protein isolate of the present invention is comprised of soy protein material having a degree of hydrolysis of about 50 STNBS to about 70 STNBS. More preferably, the soy protein material has a degree of hydrolysis of about 54 to about 65 STNBS. Still more preferably, the soy protein material has a degree of hydrolysis of about 55 STNBS to about 62 STNBS.

Measurement of the Soluble Solids Index of the Soy Protein Isolate

A ready-to-drink acidic beverage comprised, in part, of a soy protein isolate will have less sediment where the soy protein isolate has a higher solubility and/or higher suspendability. At present, there is more than one procedure available to determine solubility. The High Speed Solubility ("HSS") method separates the insoluble protein by centrifugation for 20 minutes at 45,500×g, whereas the Nitrogen Solubility Index ("NSI") method operates at 500×g for 10 minutes. Obtaining results from both the HSS and the NSI methods takes a relatively long period of time because total protein and soluble protein is measured by time consuming methods such as the Biuret, Kjeldahl, or LECO combustion procedures.

As such, an alternative method, the Soluble Solids Index ("SSI") method, was developed as a rapid method for determining the solubility of soy protein isolates. Using the SSI method, the solubility is measured based on solids, as opposed to total protein and soluble protein. For soy protein isolates, the SSI value correlates to NSI values, and is, therefore, just as valuable as the NSI values for monitoring soy protein solubility as affected by process treatments or during storage.

To calculate SSI, 12.5 g of the soy protein isolate of the present invention is weighed in a weigh boat. Deionized water (487.5 g) is then added to a blender jar. A defoamer (2-3 drops, Dow Corning Antifoam B Emulsion 1:1 with $H_2O$) is added to the water. The blender rheostat is adjusted such that the stirring speed produces a moderate vortex (approximately 14,000 rpm). The soy protein isolate sample is added within 30 seconds of the creation of the vortex, and is blended for 60 seconds. The soy protein isolate sample slurry is then transferred to a 500 ml beaker, and the beaker is covered and stirred for 30 minutes at a moderate speed. Then, two 200 g portions of the soy protein isolate sample slurry are transferred into two centrifuge bottles. The remainder portion is kept for total solids calculation. The centrifuge bottles containing the soy protein isolate sample slurry are centrifuged at 500×g for 10 minutes. The supernatant (50 ml) is withdrawn from the centrifuge bottles and placed into plastic cups. Equal portions of the soluble solids supernatant (5.0 g) and the total solids remainder portion (5.0 g) are dried at 130° C. for 2 hours and weighed to determine soluble solids and total solids, respectively. The SSI is then calculated using the following formula:

SSI(%)=(Soluble Solids/Total Solids)×100

The average from the two supernatant samples is then calculated to determine reported SSI values.

Preferably, the soluble solids index of the soy protein isolate of the present invention is from about 80% to about 100% at a pH of from about 7.0 to about 7.8. More preferably, the soluble solids index of the soy protein isolate is from about 85% to about 100% at a pH of from about 7.0 to about 7.8. Still more preferably, the soluble solids index of the soy protein isolate is greater than 90% at a pH of about 7.4.

Measurement of the Homogeneity of the Soy Protein Isolate

Homogeneity measures how well a soy protein isolate holds its suspension stability over time when dispersed into consumer applications such as ready-to-drink acidic beverages. A soy protein isolate with a greater homogeneity will result in an acidic beverage application having less sedimentation and cloudiness, and thus will be more desirable to consumers.

One method for determining homogeneity measures the separation of soy protein isolate dispersions prepared with minimal blending. This method also provides a means for judging the appearance of the suspension for guidance in determining alternative dispositions of poorer suspended products. Suspension characteristics are based on the objective measurement of the suspended material and the subjective evaluation of the appearance of the suspension.

To calculate the homogeneity in water of the soy protein isolate of the present invention, 10 g of the soy protein isolate sample is weighed. Deionized water (200 ml) is then added to a blender jar. A defoamer (3-5 drops, Pegosperse 200 ML) is added to the water. A dye (3-6 drops, 1% FD&C Blue #1) is also optionally added. The soy protein isolate sample is transferred to the blender and the blender is operated for 10 seconds at the lowest setting. The resulting dispersion is then transferred to a 250 ml graduated cylinder. After the dispersion has stood for a period of time, total volume, volume of float layer, volume of sediment layer, and appearance of the sediment (if any) is calculated using a high intensity lamp, where necessary, to distinguish layers. Where no lines are visible, and there is an obvious sediment layer, an estimation of the sediment layer is taken by averaging between the highest point of the sediment and the point at which the sediment becomes more defined.

The suspension characteristics are based on the objective measurement of the suspended material (float) and the sediment layer. The following calculations are used to determine the percent total suspension, or homogeneity, of the soy protein isolate of the present invention:

Float (%)=(Volume of Float/Total Volume)×100

Sediment (%)=(Volume of Total Sediment/Total Volume)×100

Once Float (%) and Sediment (%) are calculated, the percent total suspension, or homogeneity, can be determined using the following formula:

Homogeneity(%)=100−(Float(%)+Sediment (%))

The homogeneity of the soy protein isolate of the present invention varies over varying periods of time. For example, the soy protein isolate of the present invention may have a homogeneity in water at a pH of from about 7.0 to about 7.8 of greater than 80%, greater than 90%, greater than 95%, greater than 99%, and 100% for a period of time from about 30 minutes to about two hours. By way of further example, the soy protein isolate of the present invention may have a homogeneity in water at a pH of from about 7.0 to about 7.8 of greater than 80%, greater than 90%, greater than 95%, greater than 99%, and 100% for a period of time longer than 2 hours. Preferably, the soy protein isolate of the present invention has greater than 99% homogeneity in water at a pH of from about 7.0 to about 7.8 after about 30 minutes, and greater than 90% homogeneity in water at a pH of from about 7.0 to about 7.8 after about 2 hours. More preferably, the soy protein isolate has greater than 99% homogeneity in water at a pH of about 7.4 after about 30 minutes, and greater than 90% homogeneity in water at a pH of about 7.4 after about 2 hours.

Measurement of the Particle Size of the Soy Protein Isolate

The average particle size distribution of the soy protein isolate must be measured in order to manufacture consistent products with known physical characteristics. Varying particle size can affect numerous product characteristics, such as mouthfeel, density, solubility, and dispersibility. Particle size can also affect the hydration and suspension stability of the soy protein isolate. It has been shown that a soy protein isolate with too fine of a particle size was not as suspendable as those with an intermediate range of particle sizes, where the soy protein isolate was utilized in an acidic beverage. Without being bound to a particular theory, it appears that the dispersed soy protein isolate particles appear to be involved in the stabilizing mechanism of some components, such as pectin, commonly used in the acidic beverage.

The particle size of a soy protein isolate sample can be analyzed, for example, with a Mastersizer 2000 particle size analyzer (Malvern Instruments, United Kingdom) coupled with a Scirocco dry power feeder (Malvern Instruments, United Kingdom). Approximately 1 tablespoon of dried soy protein isolate sample is placed in the dry power feeder tray, and the particle size is analyzed by the Mastersizer 2000. Each dried soy protein isolate sample is run in triplicate, and an average particle size is calculated.

Preferably, the average particle size of the soy protein isolate of the present invention is about 15 μM to about 60 μM. Still more preferably, the average particle size of the soy protein isolate is about 18 μM to about 50 μM. Most preferably, the average particle size of the soy protein isolate is about 20 μM to about 40 μM. Within these ranges, the soy protein isolate of the present invention have superior solubility and suspendability in acidic beverages.

Sensory Measurement of the Bitterness of the Soy Protein Isolate

Proteolytic hydrolysis of soy protein material can result in the formation of bitter peptides. A strong bitter taste will impact the sensory characteristics of food systems such as beverages. As such, soy protein hydrolysates with a bitter taste have limited usage potential. One technique for determining the degree of bitterness is through the use of two sensory evaluation techniques, the Pairwise Rank Sum and Magnitude Estimation method (see Meilgaard, M. et al., "Sensory Evaluation Techniques" vol. I:85 and vol. II:83, CRC Press, Inc., Boca Raton, Fla. (1987)). The Pairwise Rank Sum method helps determine the bitterer sample, and the Magnitude Estimation helps determine the magnitude of bitterness.

The Pairwise Rank Sum method can be used to compare several samples for a single attribute, such as bitterness. This method arranges samples according to attribute intensity and provides a numerical indication of the differences between the samples and the significance of the differences. The Magnitude Estimation is a scaling technique involving the free assignment of a number by panelists to indicate relative intensities. Judgments are made in relation to the first, or reference, sample, such that the bitterness of the test sample is measured relative to the reference sample.

The bitterness of a soy protein isolate can be measured, for example, by a panel of evaluators. Twelve healthy, unbiased panel members are instructed not to eat, drink or smoke at least 20 minutes before evaluations. The panel members are placed in a well-ventilated, well-lit room free from odoriferous materials such as chemicals or cigarette smoke.

The test samples are prepared by making a mixture of 3% soy protein isolate (wt./wt.) with water. The samples are fully dispersed for at least 30 minutes, and 30 ml are transferred to each sample cup. Two reference standards are also prepared. Reference Standard 1, a nonbitter, non-enzyme-treated soy protein isolate, contains 3% Supro 500 E (The Solae Company, St. Louis, Mo.) in water. Reference Standard 2, the bitter standard, contains 3% Supro 500 E, plus 800 ppm caffeine. Each sample is coded with a randomized number or letter, and each panelist receives his or her own set of samples.

Panelists are instructed to swirl the sample in the cup, remove the lid, and place approximately 10-20 ml in their mouths for 5-10 seconds. The sample is to be swished to the back and to the roof of the mouth, and then spit out. Between each sample tasting, the panelists are instructed to rinse their mouths out with water, and are provided unsalted crackers to eat to eliminate sample carryover. Preferably, no more than six samples are evaluated for bitterness at one time.

For the Pairwise Rank Sum sensory method, panelists are instructed to indicate the bitterer sample and the relative category scale on their score sheets. For the Magnitude Estimation sensory method, panelists are instructed to determine the bitterness intensity of the sample as compared to Reference Standard 2 and record the intensity on the score sheet. The score sheet is a horizontal numbered scale of increasing "bitterness", ranging from 0 to over 130. Reference Standard 1 is denoted as "0" on the scale, and Reference Standard 2 and denoted as "100" on the scale. Once the panelists indicate the bitterness of their sample relative to the two Reference Standards on the scale, that number is multiplied by 8 to calculate the bitterness of the sample as compared to 800 ppm of the caffeine equivalent in Reference Standard 2.

Preparation of a Ready-To-Drink Acidic Beverage Containing the Soy Protein Isolate and the Measurement of its Suspension Stability Formation of serum and/or sediment is a common problem for soy protein-fortified, ready-to-drink acidic beverages due to the insolubility of the isolated soy proteins. The amount of serum and sediment is dependant upon the type and amount of soy protein material used, processing control, and beverage formulations. Serum and sediment formations are considered to be defects in the soy protein beverages, resulting in a product that is undesirable to consumers.

A ready-to-drink acidic beverage can be formulated comprising the soy protein isolate of the present invention. Preferably, the ready-to-drink acidic beverage comprises from about 0.5% to about 10% of the soy protein isolate. Still more preferably, the ready-to-drink acidic beverage comprises from about 0.5% to about 5% of the soy protein isolate. Additional ingredients that may also be added to the ready-to-drink acidic beverage include, but are not limited to, water, pectin, propylene glycol alginate, sugar, apple juice concentrate, vitamins, phosphoric acid, citric acid, ascorbic acid, and artificial coloring.

One method for measuring the suspension stability of the ready-to-drink acidic beverage containing the soy protein isolate of the present invention is by placing a sample solution in a clear, 250 ml square media bottle (Nalgene, Catalog number 2019-0250), storing it for a period of time, and then measuring the percent sediment after particular intervals of time. At these particular intervals of time, the total liquid layer (T) is measured, as well as each layer described as serum (T1), coagulation (T2), flocculation (T3), and sediment (T4) using a ruler. The serum level (T1) is considered to be the transparent watery layer at the top of the media bottle. The coagulation level (T2) is considered to be when two or more droplets merge together to form a single larger droplet. The flocculation level (T3) is considered to be when two or more droplets attach to form an aggregate in which the droplets retain their individual integrity. The sediment layer (T4) is considered to be the particles that settle to the bottom of the media bottle. The droplets or particles move downwards as a result of gravity, due to their higher density as compared to the surrounding liquid. The sediment layer can be measured at the four corners and at the four sides, and an average of these values can be taken.

Once all the measurements are taken, the percentage of each layer is calculated and the total amount suspended is calculated using the following formulae:

Serum (%)=(T1/T)(100)

Coagulation (%)=(T2/T)(100)

Flocculation (%)=(T3/T)(100)

Sediment (%)=(T4/T)(100)

Total Amount Suspended (%)=(T−(T1+T2+T3+T4))(100)

Preferably, the ready-to-drink acidic beverage comprising the soy protein isolate of the present invention has a percent sediment of not more than about 1.5% after one month and a percent sediment of not more than about 2.5% after six months. More preferably, the ready-to-drink acidic beverage comprising the soy protein isolate of the present invention has a percent sediment of not more than about 1.0% after one month and a percent sediment of not more than about 1.5% after six months.

Having described the invention in detail, it will be apparent that modifications and variations are possible without departing the scope of the invention defined in the appended claims. Furthermore, it should be appreciated that all examples in the present disclosure are provided as non-limiting examples.

EXAMPLE 1

In this Example, a soy protein isolate is produced using a process of the present invention. To water (~pH 6.7) is added white flakes (16:1 weight ratio) produced from soybeans, to produce a soy protein extract. The white flakes and water are mixed for 10-20 minutes, and the insoluble material is separated from the soluble soy protein extract and discarded. The pH of the soluble soy protein extract is then adjusted to about the isoelectric point of soy protein (~pH 4.5) with about 15N hydrochloric acid. The precipitated soy protein extract is then centrifuged and the supernatant is decanted and discarded. The remaining material is the soy protein curd. The soy protein curd is diluted with water to create a soy protein slurry having a solids content of about 12-14%. Then, the soy protein slurry is adjusted to pH 10.0 with sodium hydroxide and heated to 48-55° C.

Following heat-treatment, to the pH-adjusted soy protein slurry is added Alcalase® (Novo Nordisk A/S, Denmark) (0.3% of the weight of the soy protein curd) under good agitation for 40 minutes. During these 40 minutes, the pH of the soy protein slurry and enzyme mixture is not controlled or adjusted. After the 40 minute period, the pH of the enzyme hydrolyzed soy protein slurry is adjusted to 7.2 with hydrochloric acid (about 2N to 3N). The resulting soy protein isolate is then heated to 152° C., vacuum flush cooled to 52° C., and spray dried, yielding about 10 to 15 pounds of soy protein isolate.

EXAMPLE 2

In this Example, a soy protein isolate is produced using the process of Example 1, except that the soy protein extract is produced at pH 9.7 in an alkaline solution containing calcium hydroxide.

EXAMPLE 3

In this Example, various properties of the soy protein isolates produced in Examples 1 and 2 are compared to commercial soy protein isolates: FXP 950 (The Solae Company, St. Louis, Mo.) and Supro XT 40 (The Solae Company, St. Louis, Mo.). Specifically, the properties evaluated are: (1) Average Molecular Weight; (2) STNBS; (3) Soluble Solids Index (4) Average Particle Size; (5) Homogeneity; (6) Bitterness; and (7) Amount of Sediment after one month in a 3 g ready-to-drink acidic (RTD-A) beverage model. These properties are evaluated using the above-described test methods. Results of the comparison are shown in Table 2.

TABLE 2

Comparison of the Soy Protein Isolates of Example 1 and Example 2 with Commercial Soy Protein Isolates

| Property | FXP 950 | Supro XT 40 | Example 1 | Example 2 |
|---|---|---|---|---|
| Avg. Molecular Weight | 9,000-12,000 | 15,000-19,000 | 12,000-16,000 | 12,000-16,000 |

TABLE 2-continued

Comparison of the Soy Protein Isolates of Example 1
and Example 2 with Commercial Soy Protein Isolates

| Property | FXP 950 | Supro XT 40 | Example 1 | Example 2 |
|---|---|---|---|---|
| STNBS | 100-125 | 43-53 | 55-65 | 51-70 |
| Soluble Solids Index (%) | 95-100 | 80-90 | 95-100 | 85-98 |
| Average Particle Size (μM) | 30-40 | 40-50 | 18-50 | 18-50 |
| Homogeneity | >99% | 75-90% | >99% | >99% |
| Bitterness | >1000 | 480-580 | 510-550 | 520-600 |
| Amount of Sediment after one month in 3 g RTD-A beverage model | <0.5% | 2.6-3.1% | <0.5% | <0.5% |

As can be seen from Table 2, the soy protein isolate produced by the process of the present invention possesses both excellent suspension stability and superior flavor as compared to known soy protein isolates.

EXAMPLE 4

In this Example, two ready-to-drink acidic (RTD-A) beverages are formulated: one comprising the soy protein isolate of Example 1 or Example 2, and one comprising a commercial soy protein isolate, Supro XT 40 (The Solae Company, St. Louis, Mo.).

Trial 1

First, the soy protein isolates (3 g Example 1 soy protein isolate and 3 g Supro XT 40) are each dispersed in tap water to form a slurry. After 5 minutes, the slurry is heated to about 65.6° C. for about 10 minutes. At the same time, a separate slurry is formed with pectin and water, which is then heated to a temperature of from about 65.6° C. to about 76.7° C. for 5 minutes. The two slurries are then combined under agitation. Additional ingredients are added to the slurry in the percentages described in Table 3 below, and the slurry is mixed until all ingredients are well blended. The beverage is then homogenized at a first stage of 2500 psi and a second stage of 500 psi. Following homogenization, the beverage is pasteurized at about 102° C. for about 42 seconds, cooled to about 85° C., and placed into heat-stabilized bottles. The filled bottles are capped, inverted, and held for about 3 minutes before cooling to about 4.4° C. in an ice water bath.

The ready-to-drink acidic beverage is then stored at ambient temperature for six months. At the one month mark and at the six month mark, the percent sediment is measured. For the ready-to-drink acidic beverage containing the Supro XT 40, the percent sediment is 2.1% after one month, and 4.3% after six months. For the ready-to-drink acidic beverage containing the soy protein isolate of Example 1, the percent sediment is less than 0.5% for one month, and 1.5% after six months.

TABLE 3

The 3 g Protein RTD-A Beverage Model

| Ingredients | Percent (by weight) |
|---|---|
| Soy Protein Isolate | 1.45 |
| Water for protein hydration | 56.21 |
| Water for pectin hydration | 30.0 |
| Sugar | 10.0 |
| Pectin | 0.4 |
| Natural flavors* | 1.94 |
| TOTAL | 100.00 |

*Includes, e.g., juice concentrates, vitamins, phosphoric acid, ascorbic acid, citric acid, artificial coloring Trial 2

In this Trial, the soy protein isolates (3 g Example 2 soy protein isolate and 3 g Supro XT 40) are each dispersed in tap water to form a slurry. After 5 minutes, the slurry is heated to about 65.6° C. for about 10 minutes. At the same time, a separate slurry is formed with pectin and water, which is then heated to a temperature of from about 65.6° C. to about 76.7° C. for 5 minutes. The two slurries are then combined under agitation. Additional ingredients are added to the slurry in the percentages described in Table 4 below, and the slurry is mixed until all ingredients are well blended. The beverage is then homogenized at a first stage of 2500 psi and a second stage of 500 psi. Following homogenization, the beverage is pasteurized at about 102° C. for about 42 seconds, cooled to about 85° C., and placed into heat-stabilized bottles. The filled bottles are capped, inverted, and held for about 3 minutes before cooling to about 4.4° C. in an ice water bath.

The ready-to-drink acidic beverage is then stored at ambient temperature for six months. At the one month mark and at the six month mark, the percent sediment is measured. For the ready-to-drink acidic beverage containing the Supro XT 40, the percent sediment is 1% after one month, and 4.3% after six months. For the ready-to-drink acidic beverage containing the soy protein isolate of Example 2, the percent sediment is less than 0.5% for one month, and 0.5% after six months.

TABLE 4

The 3 g RTD-A Beverage Model

| Ingredients | Percent (by weight) |
| --- | --- |
| Soy Protein Isolate | 1.45 |
| Water for protein hydration | 56.21 |
| Water for pectin hydration | 30.0 |
| Sugar | 10.0 |
| Pectin | 0.4 |
| Natural flavors* | 1.94 |
| TOTAL | 100.00 |

*Includes, e.g., juice concentrates, vitamins, phosphoric acid, ascorbic acid, citric acid, artificial coloring Trial 3

In this Trial, the soy protein isolates (6.5 g Example 2 soy protein isolate and 6.5 g Supro XT 40) are each dispersed in tap water to form a slurry. After 5 minutes, the slurry is heated to about 65.6° C. for about 10 minutes. At the same time, a separate slurry is formed with pectin and water, which is then heated to a temperature of from about 65.6° C. to about 76.7° C. for 5 minutes. The two slurries are then combined under agitation. Additional ingredients are added to the slurry in the percentages described in Table 5 below, and the slurry is mixed until all ingredients are well blended. The beverage is then homogenized at a first stage of 2500 psi and a second stage of 500 psi. Following homogenization, the beverage is pasteurized at about 107° C. for about 7 seconds, cooled to about 85° C., and placed into heat-stabilized bottles. The filled bottles are capped, inverted, and held for about 3 minutes before cooling to about 4.4° C. in an ice water bath.

The ready-to-drink acidic beverage is then stored at ambient temperature for six months. At the one month mark and at the six month mark, the percent sediment is measured. For the ready-to-drink acidic beverage containing the Supro XT 40, the percent sediment is 8.7% after one month, and over 10% after six months. For the ready-to-drink acidic beverage containing the soy protein isolate of Example 2, the percent sediment is 1% for one month, and 1.5% after six months.

TABLE 5

The 6.5 g Protein RTD-A Beverage Model

| Ingredients | Percent (by weight) |
| --- | --- |
| Soy Protein Isolate | 3.32 |
| Water for protein hydration | 53.79 |
| Water for pectin hydration | 30.0 |
| Sugar | 10.0 |
| Pectin | 0.3 |
| Natural flavors* | 2.59 |
| TOTAL | 100.00 |

*Includes, e.g., juice concentrates, vitamins, phosphoric acid, ascorbic acid, citric acid, artificial coloring Trial 4

In this Trial, the soy protein isolates (1 g Example 1 soy protein isolate and 1 g Supro XT 40) are each dispersed in tap water to form a slurry. After 5 minutes, the slurry is heated to about 65.6° C. for about 10 minutes. At the same time, a separate slurry is formed with pectin and water, which is then heated to a temperature of from about 65.6° C. to about 76.7° C. for 5 minutes. The two slurries are then combined under agitation. Additional ingredients are added to the slurry in the percentages described in Table 6 below, and the slurry is mixed until all ingredients are well blended. The beverage is then homogenized at a first stage of 2500 psi and a second stage of 500 psi. Following homogenization, the beverage is pasteurized at about 107° C. for about 7 seconds, cooled to about 85° C., and placed into heat-stabilized bottles. The filled bottles are capped, inverted, and held for about 3 minutes before cooling to about 4.4° C. in an ice water bath.

The ready-to-drink acidic beverage is then stored at ambient temperature for six months. At the one month mark and at the two month mark, the percent sediment is measured. For the ready-to-drink acidic beverage containing the Supro XT 40, the percent sediment is 1.0% after one month, and over 3.1% after two months. For the ready-to-drink acidic beverage containing the soy protein isolate of Example 1, the percent sediment is less than 0.5% for one month, and 0.5% after two months.

TABLE 6

The 1 g Protein RTD-A Beverage Model

| Ingredients | Percent (by weight) |
| --- | --- |
| Soy Protein Isolate | 0.6 |
| Water for protein hydration | 57.26 |
| Water for pectin hydration | 30.0 |
| Sugar | 10.0 |
| Pectin | 0.2 |
| Natural flavors* | 1.94 |
| TOTAL | 100.00 |

*Includes, e.g., juice concentrates, vitamins, phosphoric acid, ascorbic acid, citric acid, artificial coloring While the invention has been explained in relation to its preferred embodiments, it is to be understood that various modifications thereof will become apparent to those skilled in the art upon reading the description. Therefore, it is to be understood that the invention disclosed herein is intended to cover such modifications as fall within the scope of the appended claims.

What is claimed is:

1. A soy protein isolate comprising soy protein material having an average molecular weight of from about 12,000 Daltons to about 18,000 Daltons and a degree of hydrolysis of from about 2.9% to about 5.2%, wherein the soy protein isolate has a soluble solids index of from about 80% to about 100% at a pH of from about 7.0 to about 7.8, an average particle size of from about 15 μM to about 60 μM, and greater than 99% homogeneity in water at a pH of from about 7.0 to about 7.8 after 30 minutes, and wherein the soy protein isolate has greater than 90% homogeneity in water at a pH of from about 7.0 to about 7.8 after 2 hours.

2. The soy protein isolate as set forth in claim 1 wherein the soy protein material has an average molecular weight of from about 14,000 Daltons to about 15,000 Daltons.

3. The soy protein isolate as set forth in claim 1 wherein the soy protein material has a degree of hydrolysis of from about 3.5% to about 4.3%.

4. The soy protein isolate as set forth in claim 1 wherein the soy protein isolate has a soluble solids index of from about 85% to about 100% at a pH of from about 7.0 to about 7.8.

5. The soy protein isolate as set forth in claim 1 wherein the soy protein isolate has greater than 99% homogeneity in water at a pH of about 7.4 after about 30 minutes, and greater than 90% homogeneity in water at a pH of about 7.4 after about 2 hours.

6. The soy protein isolate as set forth in claim 1 wherein the soy protein isolate has an average particle size of from about 20 μM to about 40 μM.

7. A ready-to-drink acidic beverage comprising a soy protein isolate comprising a soy protein material having an average molecular weight of from about 12,000 Daltons to about 18,000 Daltons, and a degree of hydrolysis of from about 2.9% to about 5.2%, and wherein the soy protein isolate has an average particle size of from about 15 μM to about 60 μM.

8. The ready-to-drink acidic beverage as set forth in claim 7 comprising from about 0.5% to about 5% of the soy protein isolate.

9. The ready-to-drink acidic beverage as set forth in claim 7 wherein the percent sediment after one month is not more than about 1.0%.

10. The ready-to-drink acidic beverage as set forth in claim 7 wherein the percent sediment after six months is not more than about 1.5%.

* * * * *